(12) United States Patent
Tabata et al.

(10) Patent No.: US 11,142,206 B2
(45) Date of Patent: Oct. 12, 2021

(54) CONTROL DEVICE FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Hayashi, Nagakute (JP); Masato Nakano, Toyota (JP); Toshiaki Tamachi, Seto (JP); Daiki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/984,810

(22) Filed: Aug. 4, 2020

(65) Prior Publication Data

US 2021/0107485 A1    Apr. 15, 2021

(30) Foreign Application Priority Data

Oct. 11, 2019   (JP) .............................. JP2019-188224

(51) Int. Cl.
| | | |
|---|---|---|
| G06F 1/00 | (2006.01) | |
| B60W 30/188 | (2012.01) | |
| B60W 10/06 | (2006.01) | |
| B60W 10/10 | (2012.01) | |
| B60W 50/00 | (2006.01) | |

(52) U.S. Cl.
CPC ........ *B60W 30/1882* (2013.01); *B60W 10/06* (2013.01); *B60W 10/10* (2013.01); *B60W 2050/0026* (2013.01); *B60W 2555/20* (2020.02)

(58) Field of Classification Search
CPC ...... F02D 41/04; F02D 41/1497; F02D 37/02; F02D 41/1401; F02D 41/005; F02D 2200/025; F02D 2041/1433; F02D 41/023; F02D 41/0007; F02D 2041/1412; F02D 2200/602; F02D 2200/0611; F02D 41/00; F02D 41/2429; F02D 41/2451; F02N 2300/2006
USPC .......................... 701/101, 103–105, 110, 111
See application file for complete search history.

(56) References Cited

U.S. PATENT DOCUMENTS

| | | | | |
|---|---|---|---|---|
| 2008/0120011 A1* | 5/2008 | Iwase | ...................... | B60K 6/40 701/102 |
| 2009/0118879 A1* | 5/2009 | Heap | ..................... | B60W 30/18 701/22 |
| 2009/0118880 A1* | 5/2009 | Heap | ..................... | B60W 10/06 701/22 |

(Continued)

FOREIGN PATENT DOCUMENTS

| | | |
|---|---|---|
| JP | 2010-179856 A | 8/2010 |
| JP | 2013-067299 A | 4/2013 |

*Primary Examiner* — John Kwon
(74) *Attorney, Agent, or Firm* — Hunton Andrews Kurth LLP

(57) ABSTRACT

When a noise generation duration time predicted by a prediction unit is equal to or less than a predetermined time and it is predicted that generation of noise can be further curbed in comparison with a case in which the noise generation duration time in which noise is generated is relatively short and the noise generation duration time is greater than the predetermined time, an engine operating point control unit controls an engine and a differential unit such that an engine operating point reaches an engine operating point in an optimal fuel-efficiency operating line and thus it is possible to curb generation of noise and to curb a decrease in fuel efficiency.

4 Claims, 8 Drawing Sheets

(56) References Cited

U.S. PATENT DOCUMENTS

| | | | | |
|---|---|---|---|---|
| 2009/0118914 A1* | 5/2009 | Schwenke | ............ | B60K 6/547 |
| | | | | 701/51 |
| 2009/0118949 A1* | 5/2009 | Heap | .................. | B60W 10/115 |
| | | | | 701/55 |
| 2013/0079965 A1 | 3/2013 | Muta et al. | | |
| 2014/0053804 A1* | 2/2014 | Rayl | .................. | F02D 41/0087 |
| | | | | 123/350 |
| 2015/0275796 A1* | 10/2015 | Pochner | ............. | F02D 41/1497 |
| | | | | 701/104 |

* cited by examiner

FIG. 5
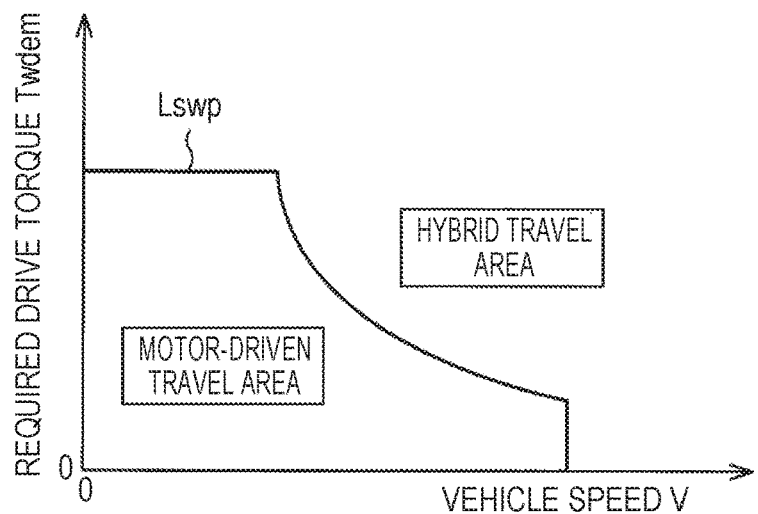
FIG. 6
| TRAVEL MODE | | | | C1 | B1 | MG1 | MG2 |
|---|---|---|---|---|---|---|---|
| EV | FORWARD/REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |
FIG. 7
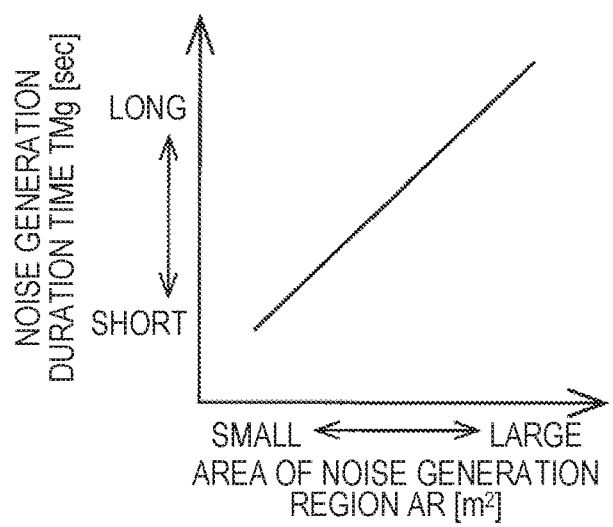

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR VEHICLE

CROSS-REFERENCE TO RELATED APPLICATION

This application claims priority to Japanese Patent Application No. 2019-188224 filed on Oct. 11, 2019, incorporated herein by reference in its entirety.

BACKGROUND

1. Technical Field

The disclosure relates to a control device for a vehicle including an engine and a stepless gear shifting mechanism that can adjust a rotation speed of the engine.

2. Description of Related Art

A vehicle including an engine and a stepless gear shifting mechanism that can adjust a rotation speed of the engine is known. An example of such a vehicle is described in Japanese Unexamined Patent Application Publication No. 2013-67299 (JP 2013-67299 A). JP 2013-67299 A has proposed a vehicle that controls the engine and the stepless gear shifting mechanism such that an operating point of the engine reaches an operating point in a predetermined optimal fuel-efficiency operating line and controls the engine and the stepless gear shifting mechanism such that the operating point of the engine reaches an operating point at which generation of noise is curbed and which is outside of the optimal fuel-efficiency operating line when the operating point of the engine is an operating point in a noise generation region in which noise is generated and in the optimal fuel-efficiency operating line.

SUMMARY

However, in JP 2013-67299 A, when the operating point of the engine is an operating point in the noise generation region, the operating point of the engine reaches an operating point which is outside of the optimal fuel-efficiency operating line and thus there is a problem in that fuel efficiency decreases.

The disclosure provides a control device for a vehicle that can curb generation of noise and curb a decrease in fuel efficiency.

According to a first aspect of the disclosure, there is provided a control device for (a) a vehicle including an engine and a stepless gear shifting mechanism that is able to adjust a rotation speed of the engine, the control device controlling the engine and the stepless gear shifting mechanism such that an operating point of the engine reaches an operating point in a predetermined optimal fuel-efficiency operating line, the control device including: (b) a prediction unit configured to predict a noise generation duration time in which the operating point of the engine will stay in a noise generation region in which noise is generated in the optimal fuel-efficiency operating line when the operating point of the engine reaches an operating point in the noise generation region at the time of controlling the engine and the stepless gear shifting mechanism such that the operating point of the engine reaches an operating point in the optimal fuel-efficiency operating line; and (c) a control unit configured to control the engine and the stepless gear shifting mechanism such that the operating point of the engine reaches an operating point in the optimal fuel-efficiency operating line when the noise generation duration time predicted by the prediction unit is equal to or less than a predetermined time which is determined in advance and to control the engine and the stepless gear shifting mechanism such that the operating point of the engine reaches an operating point at which generation of noise is curbed and which is outside of the optimal fuel-efficiency operating line when the noise generation duration time predicted by the prediction unit is greater than the predetermined time.

A second aspect of the disclosure provides the control device for a vehicle according to the first aspect, wherein (a) the engine includes a supercharger and (b) the prediction unit is configured to predict the noise generation duration time based on a rate of change of a supercharging pressure from the supercharger.

A third aspect of the disclosure provides the control device for a vehicle according to the second aspect, wherein the supercharger includes a compressor and a compressor rotary machine that rotationally drives the compressor, and changes the supercharging pressure by controlling a rotation speed of the compressor using the compressor rotary machine.

A fourth aspect of the disclosure provides the control device for a vehicle according to any one of the first to third aspects, wherein (a) an area of the noise generation region changes depending on a travel state of the vehicle and (b) the prediction unit is configured to predict the noise generation duration time based on the area of the noise generation region.

With the control device for a vehicle according to the first aspect of the disclosure, when the noise generation duration time predicted by the prediction unit is equal to or less than the predetermined time and it is predicted that the time in which the noise is generated is relatively short and generation of the noise can be further curbed in comparison with a case in which the noise generation duration time is greater than the predetermined time, the control unit controls the engine and the stepless gear shifting mechanism such that the operating point of the engine reaches an operating point in the optimal fuel-efficiency operating line. Accordingly, it is possible to curb generation of noise and to curb a decrease in fuel efficiency.

With the control device for a vehicle according to the second aspect of the disclosure, when the engine includes the supercharger, the prediction unit can appropriately predict the noise generation duration time based on the rate of change of the supercharging pressure.

With the control device for a vehicle according to the third aspect of the disclosure, particularly, when the supercharger changes the supercharging pressure by controlling the rotation speed of the compressor using the compressor rotary machine, the prediction unit can appropriately predict the noise generation duration time.

With the control device for a vehicle according to the fourth aspect of the disclosure, the prediction unit can appropriately predict the noise generation duration time based on the area of the noise generation region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating an example of a power source switching map which is used for switching control between motor-driven travel and hybrid-vehicle travel;

FIG. 6 is a diagram illustrating operating states of a clutch and a brake in each travel mode;

FIG. 7 is a diagram illustrating a relationship between a noise generation duration time predicted by a prediction unit which is provided in an electronic control unit illustrated in FIG. 1 and an area of a noise generation region;

DETAILED DESCRIPTION OF EMBODIMENTS

Hereinafter, embodiments of the disclosure will be described in detail with reference to the accompanying drawings.

Figure 1:
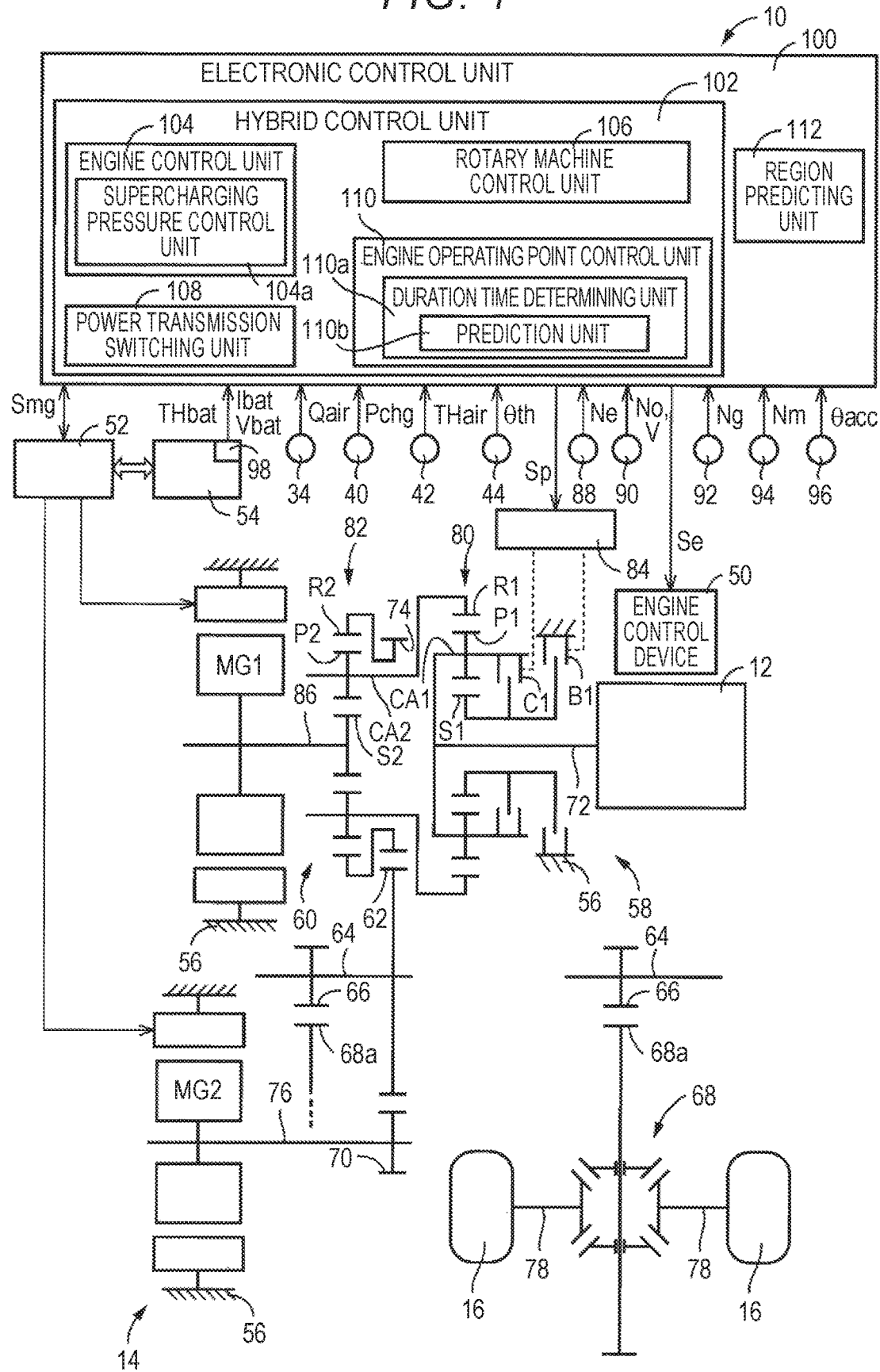
FIG. 1 is a diagram schematically illustrating a configuration of a vehicle to which the disclosure is applied and illustrating principal parts of a control function and a control system for various types of control in the vehicle.

FIG. 1 is a diagram schematically illustrating a configuration of a vehicle 10 to which the disclosure is applied and illustrating principal parts of a control function and a control system for various types of control in the vehicle 10. In FIG. 1, the vehicle 10 is a hybrid vehicle that includes an engine 12, a first rotary machine MG1, a second rotary machine MG2, a power transmission device 14, and driving wheels 16.

Figure 2:
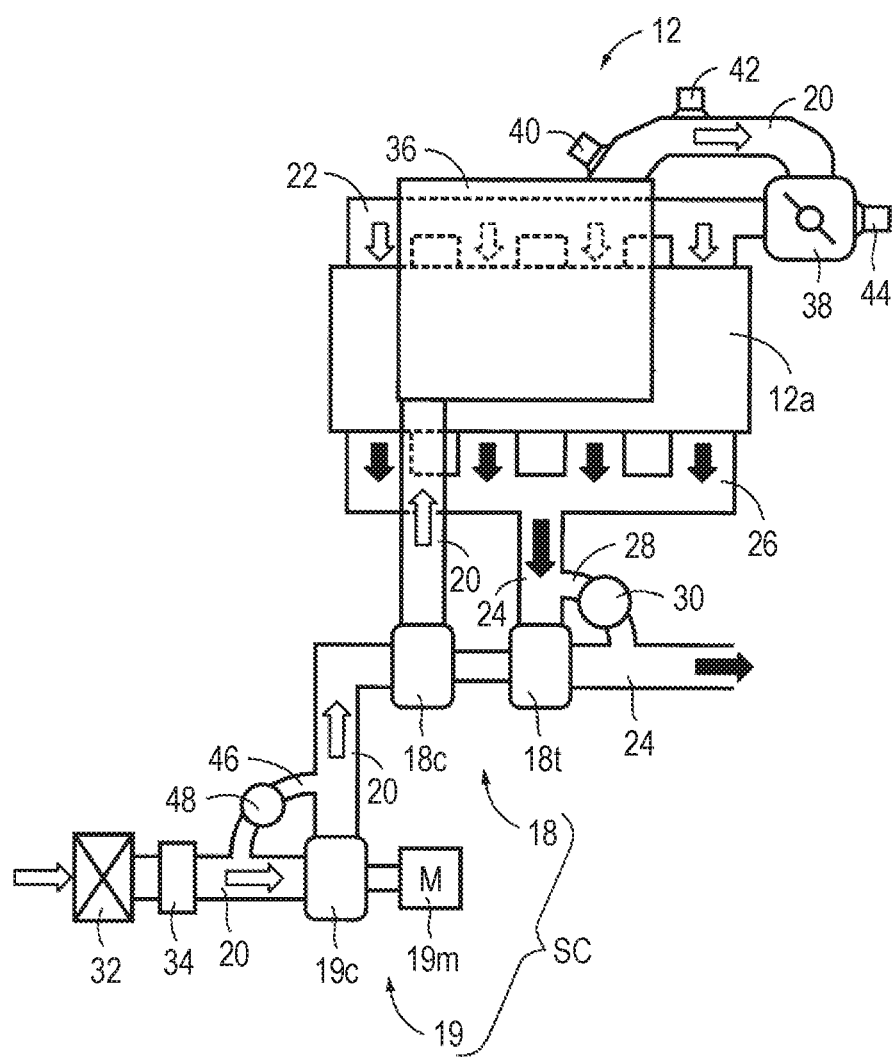
FIG. 2 is a diagram schematically illustrating a configuration of an engine.

FIG. 2 is a diagram schematically illustrating a configuration of the engine 12. In FIG. 2, the engine 12 is a power source for travel of the vehicle 10 and is a known internal combustion engine such as a gasoline engine or a diesel engine including a supercharger SC, that is, an engine with the supercharger SC. The supercharger SC includes an exhaust turbine type supercharger 18 and an electric supercharger 19. An intake pipe 20 is provided in an intake system of the engine 12 and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a.

The supercharger 18 is a known turbocharger including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

The electric supercharger 19 includes an electric compressor (a compressor) 19c that is provided in the intake pipe 20 upstream from the compressor 18c and an electric motor (a compressor rotary machine) 19m that is connected to the electric compressor 19c, and electrically performs supercharging. The electric compressor 19c is rotationally driven by the electric motor 19m to compress intake air of the engine 12. The electric motor 19m is controlled by an electronic control unit (a control device) 100 which will be described later such that the electric compressor 19c is rotationally driven. The electric supercharger 19 is driven, for example, such that a response delay of supercharging by the supercharger 18 is complemented. That is, the electric supercharger 19 serves to change a supercharging pressure Pchg by controlling a rotation speed Ncp [rpm] of the electric compressor 19c using the electric motor 19m.

An exhaust bypass 28 that causes exhaust gas to flow from upstream to downstream with respect to the turbine 18t by bypassing the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening amount of the waste gate valve 30 is continuously adjusted by causing an electronic control unit 100 which will be described later to operate an actuator which is not illustrated. As the valve opening amount of the waste gate valve 30 increases, it becomes easier for exhaust gas of the engine 12 to be discharged via the exhaust bypass 28. Accordingly, in a supercharged state of the engine 12 in which a supercharging operation of the supercharger 18 works, a supercharging pressure Pchg from the supercharger SC decreases as the valve opening amount of the waste gate valve 30 increases. The supercharging pressure Pchg is a pressure of intake air and is an air pressure downstream from the compressor 18c in the intake pipe 20. A side in which the supercharging pressure Pchg is low is, for example, a side with a pressure of intake air in a non-supercharged state of the engine 12 in which the supercharging operation of the supercharger SC does not work at all, that is, a side with a pressure of intake air in an engine without the supercharger SC.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the electric compressor 19c. An intercooler 36 which is a heat exchanger that cools intake air compressed by the supercharger SC by exchanging heat between intake air and outside air or a coolant is provided in the intake pipe 20 downstream from the compressor 18c. An electronic throttle valve 38 of which opening amount and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg and an intake air temperature sensor 42 that detects an intake air temperature THair which is the temperature of intake air are provided in the intake pipe 20 between the intercooler 36 and the electronic throttle valve 38. A throttle valve opening amount sensor 44 that detects a throttle valve opening amount θth which is an opening amount of the electronic throttle valve 38 is provided in the vicinity of the electronic throttle valve 38, for example, in the throttle actuator.

An intake bypass 46 that causes an upstream side and a downstream side with respect to the electric compressor 19c to communicate with each other is provided in parallel in the intake pipe 20. An air bypass valve (=ABV) 48 that opens and closes a passage of the intake bypass 46 is provided in the intake bypass 46. Opening amount and closing of the air bypass valve 48 are controlled by causing the electronic control unit 100 which will be described later to operate an actuator which is not illustrated. For example, the air bypass valve 48 is opened such that the electric supercharger 19 does not serve as a passage resistance at the time of non-operation of the electric supercharger 19.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, the waste gate valve 30, the electric motor 19m, and the air bypass valve 48.

Referring back to FIG. 1, the first rotary machine MG1 and the second rotary machine MG2 are electric rotary machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque which is a positive torque on an acceleration side and is a regenerative torque which is a negative torque on a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit (a stepless gear shifting mechanism) 60, a driven gear 62, a driven shaft 64, a final gear 66, a differential gear 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential gear 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel with the input shaft 72 is connected to the reduction gear 70 separately from the input shaft 72 and the reduction gear 70 is connected to the second rotary machine MG2 in a power-transmittable manner. The power transmission device 14 includes an axle 78 that is connected to the differential gear 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential gear 68, the axle 78, and the like. In this way, the second rotary machine MG2 is a rotary machine that is connected to the driving wheels 16 in a power-transmittable manner. In the power transmission device 14, the engine 12, the gear shifting unit 58, the differential unit 60, the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear device including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear device including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via the brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via the clutch C1.

The clutch C1 and the brake B1 are wet frictional engagement devices and are multi-disc hydraulic frictional engagement devices of which engagement is controlled by a hydraulic actuator. In the clutch C1 and the brake B1, operating states such as an engaged state and a disengaged state are switched between based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84.

In a state in which both the clutch C1 and the brake B1 are disengaged, a differential operation of the first planetary gear mechanism 80 is permitted. Accordingly, in this state, since a reaction torque of the engine torque Te does not appear in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation of the first sun gear S1 of the first planetary gear mechanism 80 is prohibited and rotation of the first ring gear R1 is increased to be greater than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element that is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60. The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in an overdrive state, an increase in torque of the first rotary machine MG1 is curbed. Controlling the operating state of the first rotary machine MG1 refers to performing operation control of the first rotary machine MG1.

Figure 3:
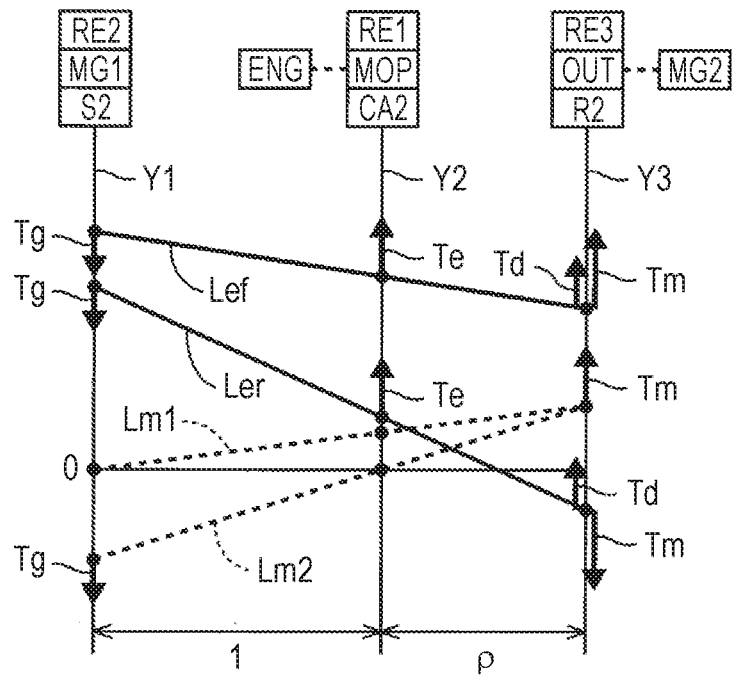
FIG. 3 is a collinear diagram illustrating a relative relationship between rotation speeds of rotary elements in a differential unit.

FIG. 3 is a collinear diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio $\rho$ (=number of teeth of the sun gear/number of teeth of the ring gear) of the second planetary gear mechanism 82. In the relationship between the vertical axes in the collinear diagram, when the gap between a sun gear and a carrier corresponds to "1," the gap between the carrier and a ring gear corresponds to the gear ratio $\rho$.

A solid line Lef in FIG. 3 denotes an example of relative speeds of the rotary elements at the time of forward travel in an HV travel mode which is a travel mode in which hybrid travel (=HV travel) using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te that is a positive torque which is input to the second carrier CA2 via the gear shifting unit 58 is input to the second sun gear S2, a direct engine-transmitted torque Td which is a positive torque appears in the second ring gear R2. For example, when the MG1 torque Tg $(=-\rho/(1+\rho)\times Te)$ which is a reaction torque with respect to the engine torque Te that is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td (=Te/$(1+\rho)=-(1/\rho)\times Tg$) appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to required drive power. The first rotary machine MG1 serves as a power generator when a negative torque is generated at the time of positive rotation. Generated electric power Wg of the first rotary machine MG1 is charged into the battery 54 or is consumed in the second rotary machine MG2. The second rotary machine MG2 outputs the MG2 torque Tm using all or some of the generated electric power Wg or using electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the hybrid travel mode, when the rotation speed of the first rotary machine MG1, that is, the rotation speed of the second sun gear S2, is increased or decreased by controlling the operating state of the first rotary machine MG1 with respect to an output rotation speed No which is the rotation speed of the drive gear 74 which is constrained on rotation of the driving wheels 16, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point (an operating point) Open is set to an efficient operating point. This hybrid type is referred to as a mechanical split type or a split type. The differential unit 60 is a stepless gear shifting mechanism that can adjust the engine rotation speed Ne by changing the gear ratio γ (=Nc2/No) by controlling the operating state of the first rotary machine MG1. The gear ratio γ is expressed as a value of a ratio of the rotation speed Nc2 of the second carrier CA2 to the output rotation speed No. An operating point is an operating point which is expressed by a rotation speed and a torque, and the engine operating point OPeng is an operating point of the engine 12 which is expressed by the engine rotation speed Ne and the engine torque Te.

A dotted line Lm1 in FIG. 3 represents an example of relative speeds of the rotary elements at the time of forward travel in a single-motor-driven EV mode in which motor-driven travel using only the second rotary machine MG2 as a power source is possible in motor-driven travel (=EV travel) mode. A dotted line Lm2 in FIG. 3 represents an example of relative speeds of the rotary elements at the time of forward travel in a double-motor-driven EV mode in which motor-driven travel using both the first rotary machine MG1 and the second rotary machine MG2 as power sources is possible in the EV travel mode. The EV travel mode is a travel mode in which motor-driven travel using at least one of the first rotary machine MG1 and the second rotary machine MG2 as a power source in a state in which the operation of the engine 12 is stopped is possible.

In the single-motor-driven EV mode, when both the clutch C1 and the brake B1 are disengaged and the gear shifting unit 58 falls into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control is performed such that the first rotary machine MG1 is maintained at zero rotation, the differential unit 60 is in the neutral state and thus the drive torque is not affected.

In the double-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 further includes an electronic control unit 100 serving as a controller including the control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a super-charging pressure Pchg, an intake air temperature THair, a throttle valve opening amount θth, an engine rotation speed Ne, an output rotation speed No corresponding to a vehicle speed V, an MG1 rotation speed Ng which is the rotation speed of the first rotary machine MG1, an MG2 rotation speed Nm which is the rotation speed of the second rotary machine MG2, an accelerator opening amount θacc which is an accelerator operation amount by a driver indicating the magnitude of the driver's acceleration operation, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening amount sensor 44, an engine rotation speed sensor 88, an output rotation speed sensor 90, an MG1 rotation speed sensor 92, an MG2 rotation speed sensor 94, an accelerator opening amount sensor 96, and a battery sensor 98) which are provided in the vehicle 10. The electronic control unit 100 outputs various command signals (for example, an engine control command signal Se for controlling the engine 12, a rotary machine control command signal Smg for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, and the hydraulic pressure control circuit 84) which are provided in the vehicle 10.

The electronic control unit 100 calculates a state of charge value SOC [%] which is a value indicating the state of charge of the battery 54, for example, based on the battery charging/discharging current Ibat and the battery voltage Vbat. The electronic control unit 100 calculates chargeable and dischargeable power Win and Wout for defining a feasible range of a battery power Pbat which is the power of the battery 54, for example, based on the battery temperature THbat and the state of charge value SOC of the battery 54. The chargeable and dischargeable power Win and Wout includes a chargeable power Win which is a possible input power for defining a limitation of input power of the battery 54 and a dischargeable power Wout which is a possible output power for defining a limitation of output power of the battery 54. For example, the chargeable and dischargeable power Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the state of charge value SOC increases in an area in which the state of charge value SOC is high. For example, the dischargeable power Wout decreases as the state of charge value SOC decreases in an area in which the state of charge value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 104, that controls the operation of the engine 12, a function of a rotary machine control means, that is, a rotary machine control unit 106, that controls the operations of the first rotary machine MG1 and the second rotary machine MG2 via the inverter 52, and a function of a power transmission switching means, that is, a power transmission switching unit 108, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required for the vehicle 10, for example, by applying the accelerator opening amount θacc and the vehicle speed V to a relationship which is acquired and stored in advance by experiment or design, that is, a predetermined relationship, for example, a drive power map. In other words, the required drive torque Twdem is a required drive power Pwdem at the vehicle speed V at that time. Here, the output rotation speed No or the like may be used instead of the vehicle speed V. As the drive power map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54, or the like.

For example, when the vehicle travels in the HV travel mode, the engine control command signal Se is a command value of an engine power Pe for outputting a target engine torque Tetgt at a target engine rotation speed Netgt in consideration of an optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of generated electric power Wg of the first rotary machine MG1 that outputs the MG1 torque Tg at the MG1 rotation speed Ng at the time of outputting the command as a reaction torque for causing the engine rotation speed Ne to reach the target engine rotation speed Netgt and is a command value of power consumption Wm of the second rotary machine MG2 that outputs the MG2 torque Tm at the MG2 rotation speed Nm at the time of outputting the command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the direct engine-transmitted torque Td.

The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, a power, of the engine 12 and the required engine power Pedem is an output required for the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
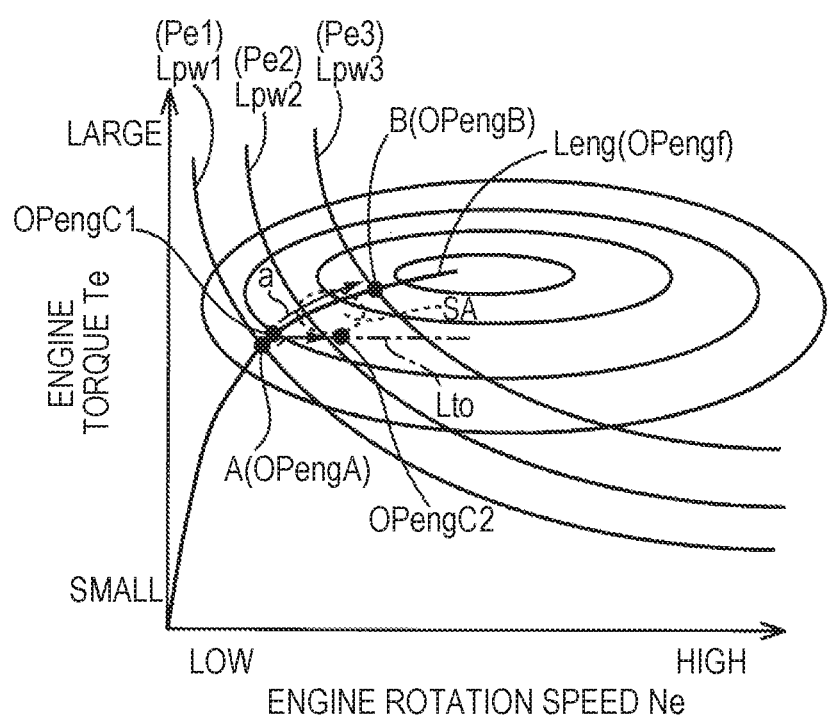
FIG. 4 is a diagram illustrating an example of an optimal engine operating point.

FIG. 4 is a diagram illustrating an example of the optimal engine operating point OPengf in a two-dimensional coordinate system with the engine rotation speed Ne and the engine torque Te as variables. In FIG. 4, a solid line Leng, that, is, a predetermined optimal fuel-efficiency operating line Leng, denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point. For example, when the target engine operating point OPengtgt changes from the point A to the point B with an increase in the accelerator opening amount θacc, the engine operating point OPeng is controlled such that it changes on a path a passing through the optimal engine operating points OPengf.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the state of charge value SOC of the battery 54 is less than a predetermined engine start threshold value or when warming-up of the engine 12 is necessary. The engine start threshold value is a predetermined threshold value for determining whether the state of charge value SOC indicates that the battery 54 needs to be charged by forcibly starting the engine 12.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the State of charge value SOC of the battery 54 is less than the engine-start threshold value or when warming-up of the engine 12 is necessary, the motor-driven travel area in FIG. 5 may be changed to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a double-motor-driven EV mode. Although the required drive power Pwdem can be realized by only the second rotary machine MG2, the hybrid control unit 102 may set up the double-motor-driven EV mode when use of both the first rotary machine MG1 and the second rotary machine MG2 is more efficient than use of only the second rotary machine MG2.

The hybrid control unit 102 controls engagement operations of the clutch C1 and the brake B1 based on the set-up travel mode. The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of use in combination with engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the double-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 falls into the neutral state, the differential unit 60 falls into a neutral state in which a reaction torque of the MG1 torque Tg does not appear in the second carrier CA2 connected to the first ring gear R1. In this state, the hybrid control unit 102 causes the second rotary machine MG2 to output the MG2 torque Tm for travel (see the dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 corotates with the second carrier CA2 but the gear shifting unit 58 is in the neutral state, the engine 12 does not corotate but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy does not appear at the time of travel in the single-motor-driven EV mode, use in combination with the engine brake can be considered. When the engine brake is used in combination, the brake B1 or the clutch C1 is engaged (see "use in combination with engine brake" in FIG. 6). When the brake B1 or the clutch C1 is engaged, the engine 12 is in a corotating state and the engine brake operates.

The double-motor-driven EV mode is realized in a state in which both the clutch C1 and the brake B1 are engaged. In the double-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is also stopped. When rotation of the second carrier CA2 is stopped, a reaction torque of the MG1 torque Tg appears in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the double-motor-driven EV mode, both the first rotary machine MG1 and the second rotary machine MG2 can be rotated oppositely to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 is increased and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see the solid line Lef in FIG. 3). In the HV travel mode, for example, in the low state of the HV travel mode, the second rotary machine MG2 can also be rotated oppositely to the rotating direction at the time of forward travel to allow reverse travel (see the solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

In FIG. 4, a noise generation region SA in which noise such as rattling (gear rattling) with pulsation of the engine torque Te as a vibration source is generated is determined in advance. When the engine operating point OPeng is an engine operating point OPeng in the noise generation region SA, noise may be generated. Accordingly, when the engine operating point OPeng is an engine operating point OPeng in the noise generation region SA, it is conceivable that the engine operating point OPeng be shifted to an engine operating point OPeng which is outside of the noise generation region SA such that generation of noise is curbed. However, for example, as illustrated in FIG. 4, the noise generation region SA is disposed in the optimal fuel-efficiency operating line Leng. Accordingly, when the engine operating point OPeng is outside of the noise generation region SA, the engine operating point OPeng gets away from the optimal fuel-efficiency operating line Leng and thus fuel efficiency may decrease. Therefore, in order to curb generation of noise and to curb a decrease in fuel efficiency, for example, when it is predicted that the engine operating point OPeng enters the noise generation region SA, the hybrid control unit 102 predicts a noise generation duration time TMg in which the engine operating point OPeng will stay in the noise generation region SA, controls the engine 12 and the differential unit 60 such that the engine operating point OPeng reaches an engine operating point OPeng in the optimal fuel-efficiency operating line Leng when the noise generation duration time TMg is equal to or less than a predetermined time TMg1 which is determined in advance, and controls the engine 12 and the differential unit 60 such that the engine operating point OPeng reaches an engine operating point OPeng at which generation of noise is curbed and which is outside of an engine operating point OPeng in the optimal fuel-efficiency operating line Leng when the noise generation duration time TMg is greater than the predetermined time TMg1.

Specifically, the electronic control unit 100 includes an engine operating point control means, that is, an engine operating point control unit (a control unit) 110, in the hybrid control unit 102 in order to realize a control function of curbing generation of noise and curbing a decrease in fuel efficiency. The electronic control unit 100 further includes a region predicting means, that is, a region predicting unit 112.

The engine control unit 104 includes a supercharging pressure control means, that is, a supercharging pressure control unit 104a. The supercharging pressure control unit 104a controls a rotation speed Ncp of the electric compressor 19c and a valve opening amount of the waste gate valve 30 such that the supercharging pressure Pchg which is detected by the supercharging pressure sensor 40 reaches a target supercharging pressure Pchgtgt. The target supercharging pressure Pchgtgt is calculated, for example, based on the engine rotation speed Ne which is detected by the engine rotation speed sensor 88 and the accelerator opening amount θacc which is detected by the accelerator opening amount sensor 96.

The region predicting unit 112 predicts whether the engine operating point OPeng enters in the noise generation region SA in the near future such as after several seconds based on the current travel conditions of the vehicle 10. For example, the region predicting unit 112 predicts an engine operating point OPeng after several seconds based on the current engine torque Te and an amount of change of the engine rotation speed Ne and predicts whether the engine operating point OPeng enters the noise generation region SA in the near future, for example, based on whether the predicted engine operating point OPeng enters the noise generation region SA illustrated in FIG. 4. In the noise generation region SA, the width of the noise generation region SA, that is, the area AR of the noise generation region SA, changes depending on the travel conditions of the vehicle 10, for example, the magnitude of the MG2 torque Tm which is output from the second rotary machine MG2. For example, as the magnitude of the MG2 torque Tm increases, the area AR of the noise generation region SA decreases. The electronic control unit 100 stores a plurality of noise generation regions SA which are determined in advance for each MG2 torque Tm which is output from the second rotary machine MG2, and the region predicting unit 112 changes the noise generation region SA illustrated in FIG. 4 according to the magnitude of the MG2 torque Tm.

The engine operating point control unit 110 includes a duration time determining unit 110a, and the duration time determining unit 110a includes a prediction unit 110b. When the region predicting unit 112 predicts that the engine operating point OPeng enters the noise generation region SA in the near future, the prediction unit 110b predicts a noise generation duration time TMg [sec] in which the engine operating point OPeng will stay in the noise generation region SA from the noise generation region SA and the moving path and speed of the engine operating point OPeng. For example, when the region predicting unit 112 predicts that the engine operating point OPeng enters the noise generation region SA in the near future, the prediction unit 110b calculates the noise generation duration time TMg from a predetermined expression with the area AR [m$^2$] of the noise generation region SA, the rate of change Vp [kPa/sec] of the supercharging pressure Pchg, a rate of change Vg [Nm/sec] of the MG1 torque, that is, a reaction torque, of the first rotary machine MG1, and the like as variables. For example, the area AR of the noise generation region SA in the expression is an area of a noise generation region SA corresponding to the MG2 torque Tm which is output from the second rotary machine MG2 when the region predicting unit 112 predicts that the engine operating point OPeng enters the noise generation region SA in the near future. The rate of change Vp [kPa/sec] of the supercharging pressure Pchg is an amount of change of the supercharging pressure Pchg per unit time. For example, the rate of change Vp of the supercharging pressure Pchg in the expression is calculated from a supercharging pressure Pchg_n which is detected by the supercharging pressure sensor 40 when the region predicting unit 112 predicts that the engine operating point OPeng enters the noise generation region SA in the near future and a previous supercharging pressure Pchg_n−1 which is detected by the supercharging pressure sensor 40 before the supercharging pressure Pchg_n is detected. The rate of change Vg [Nm/sec] of the MG1 torque Tg is an amount of change of the MG1 torque Tg per unit time. For example, the rate of change Vg of the MG1 torque Tg in the expression can be calculated from a rotary machine control command signal Smg_n which is output from the electronic control unit 100 to the inverter 52 when the region predicting unit 112 predicts that the engine operating point OPeng enters the noise generation region SA in the near future and a previous rotary machine control command signal Smg_n−1 of the rotary machine control command signal Smg_n output to the inverter 52.

Figure 8:
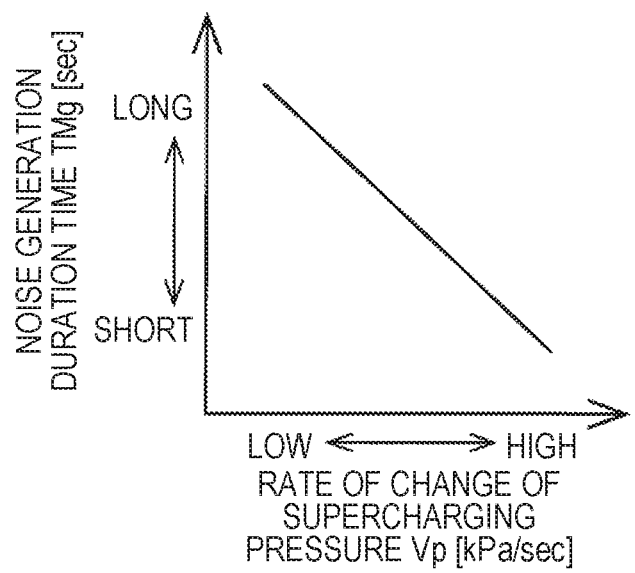
FIG. 8 is a diagram illustrating a relationship between the noise generation duration time predicted by the prediction unit which is provided in the electronic control unit illustrated in FIG. 1 and a rate of change of a supercharging pressure.
Figure 9:
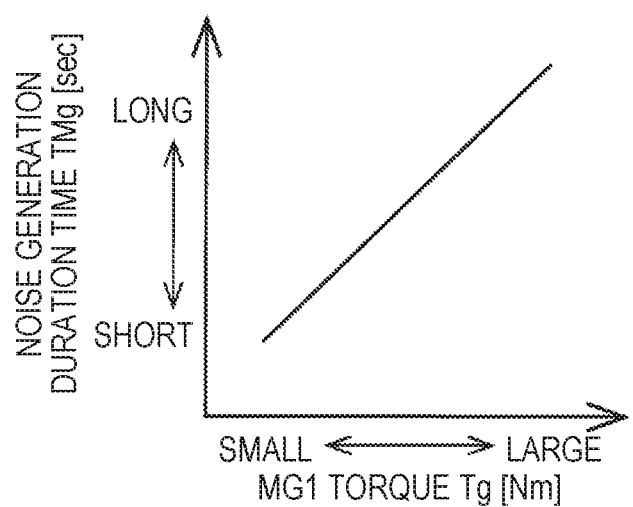
FIG. 9 is a diagram illustrating a relationship between a noise generation duration time predicted by the prediction unit which is provided in the electronic control unit illustrated in FIG. 1 and an MG1 torque.

The prediction unit 110b predicts the noise generation duration time TMg based on the area AR of the noise generation region SA, that is, the width of the noise generation region SA as illustrated in FIG. 7. That is, the prediction unit 110b predicts the noise generation duration time TMg such that the noise generation duration time TMg increases as the area AR of the noise generation region SA increases and decreases as the area AR of the noise generation region SA decreases. The prediction unit 110b predicts the noise generation duration time TMg based on the rate of change Vp of the supercharging pressure Pchg as illustrated in FIG. 8. That is, the prediction unit 110b predicts the noise generation duration time TMg such that the noise generation duration time TMg decreases as the rate of change Vp of the supercharging pressure Pchg increases and increases as the rate of change Vp of the supercharging pressure Pchg decreases. The prediction unit 110b predicts the noise generation duration time TMg based on the magnitude of the MG1 torque Tg, that is, the magnitude of the reaction torque, which is output from the first rotary machine MG1 as illustrated in FIG. 9. For example, the prediction unit 110b predicts the noise generation duration time TMg to increase as the magnitude of the MG1 torque Tg increases, and predicts the noise generation duration time TMg to decrease as the magnitude of the MG1 torque Tg decreases.

When the prediction unit 110b predicts the noise generation duration time TMg, the duration time determining unit 110a determines whether the noise generation duration time TMg predicted by the prediction unit 110b is greater than a predetermined time TMg1 which is determined in advance. For example, the predetermined time TMg1 [sec] is a relatively short time in which noise generated in the vehicle 10 is not felt well by a driver.

When the region predicting unit 112 predicts that the engine operating point OPeng does not enter the noise generation region SA in the near future, the engine operating point control unit 110 controls the engine 12 and the differential unit 60 such that the engine operating point OPeng is an optimal engine operating point OPengf in the optimal fuel-efficiency operating line Leng in which the required engine power Pedem is realized.

When a predetermined first condition CD1 is satisfied, the engine operating point control unit 110 controls the engine 12 and the differential unit 60 such that the engine operating point OPeng is an engine operating point OPeng at which generation of noise is curbed and which is outside of the engine operating point OPeng in the optimal fuel-efficiency operating line Leng, that is, such that the engine operating point OPeng is an engine operating point OPeng which is outside of the noise generation region SA and which is outside of an engine operating point OPeng in the optimal fuel-efficiency operating line Leng. The first condition CD1 is satisfied when the region predicting unit 112 predicts that the engine operating point OPeng enters the noise generation region SA in the near future and the duration time determining unit 110a determines that the noise generation duration time TMg is greater than the predetermined time TMg1. For example, when the first condition CD1 is satisfied, the engine operating point control unit 110 controls the engine 12 and the differential unit 60 such that an engine operating point OPengC1 is a predetermined engine operating point OPengC2 in an equi-engine-torque line Lto which is outside of the noise generation region SA as illustrated in FIG. 4. That is, when the first condition CD1 is satisfied as illustrated in FIG. 4, the engine operating point control unit 110 controls the gear ratio γ of the differential unit 60 such that the engine rotation speed Ne increases to an engine rotation speed Ne at the engine operating point OPengC2 while controlling the supercharging pressure Pchg of the supercharger SC such that the engine torque Te does not change from the engine torque Te at the engine operating point OPengC1. The engine rotation speed Ne increases to realize the required engine power Pedem. The engine operating point OPengC1 is an engine operating point OPeng when the region predicting unit 112 predicts that the engine operating point OPeng enters the noise generation region SA in the near future. The equi-engine-torque line Lto is a line indicating the same engine torque Te as the engine torque Te at the engine operating point OPeng when the region predicting unit 112 predicts that the engine operating point OPeng enters the noise generation region SA in the near future.

When a predetermined second condition CD2 is satisfied, the engine operating point control unit 110 controls the engine 12 and the differential unit 60 such that the engine operating point OPeng is the optimal engine operating point OPengf in the optimal fuel-efficiency operating line Leng in which the required engine power Pedem is realized. The second condition CD2 is satisfied when the region predicting unit 112 predicts that the engine operating point OPeng enters the noise generation region SA in the near future and the duration time determining unit 110a determines that the noise generation duration time TMg is not greater than the predetermined time TMg1.

Figure 10:
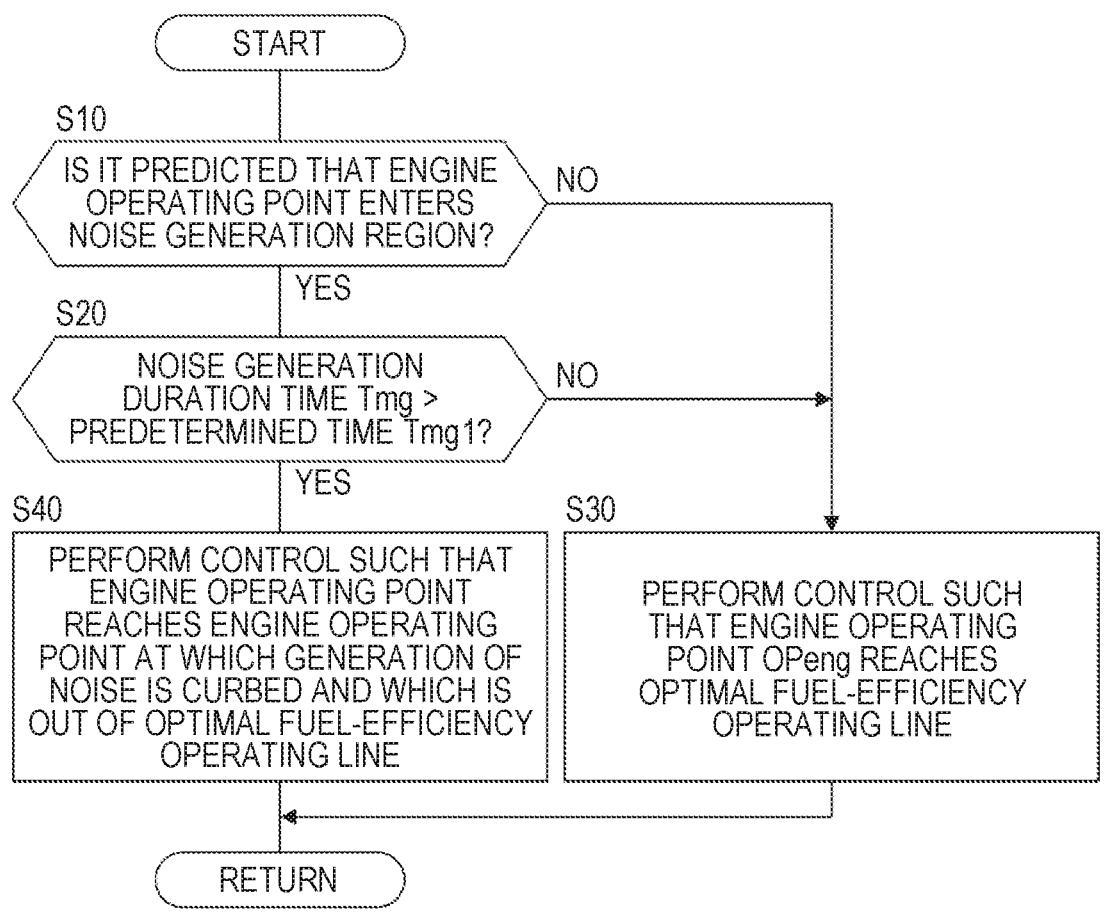
FIG. 10 is a flowchart illustrating a principal part of a control operation of the electronic control unit and illustrating a control operation for curbing generation of noise and curbing a decrease in fuel efficiency.
Figure 11:
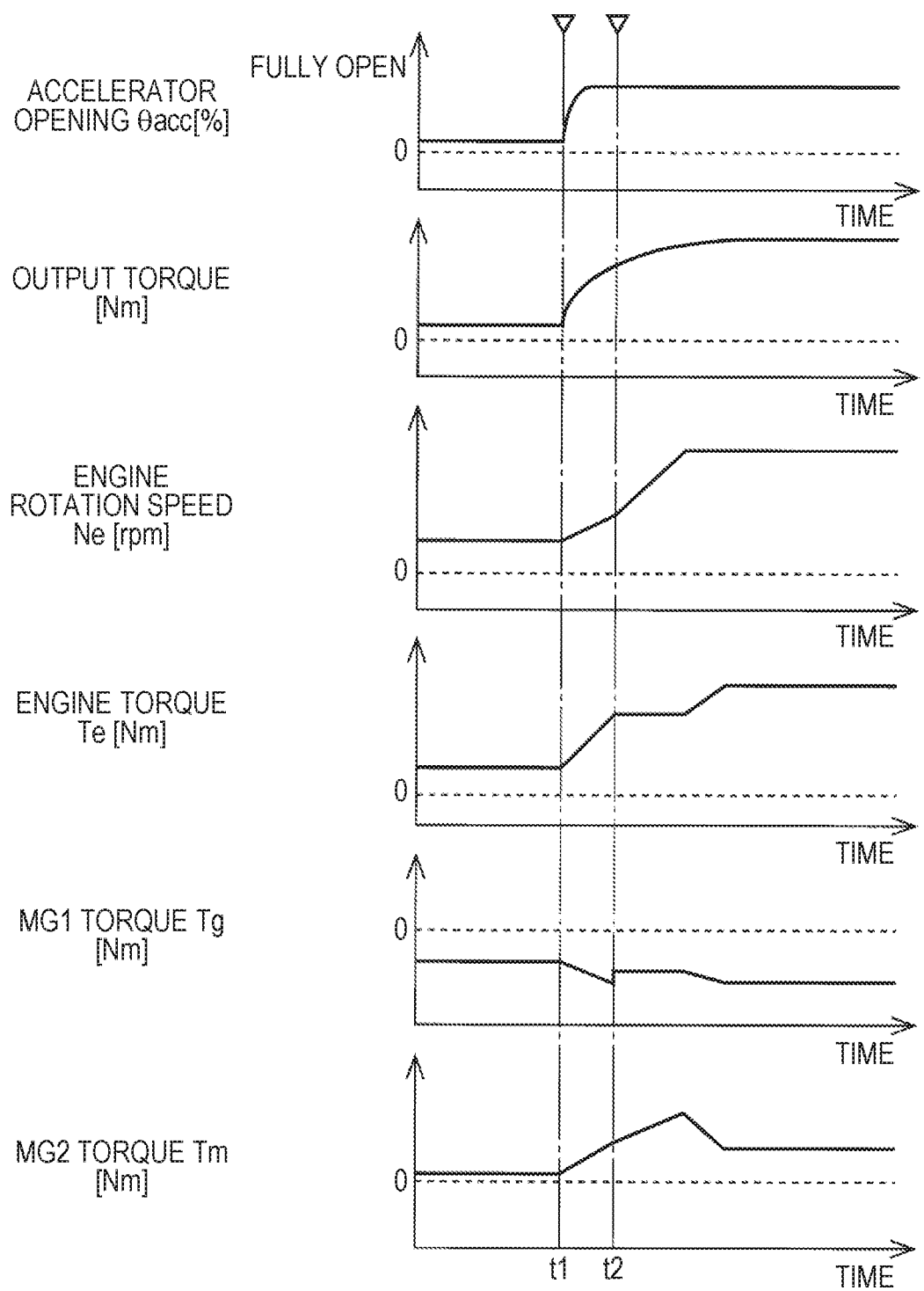
FIG. 11 is a timing chart illustrating an example in which the control operation illustrated in FIG. 10 is performed.

FIG. 10 is a flowchart illustrating a principal part of the control operation of the electronic control unit 100 and illustrating the control operation for curbing generation of noise and curbing a decrease in fuel efficiency. FIG. 11 is a timing chart illustrating an example in which the control operation illustrated in the flowchart of FIG. 10 is performed.

In FIG. 10, first, in Step (the word "step" is omitted below) S10 corresponding to the function of the region predicting unit 112, it is predicted whether the engine operating point OPeng enters the noise generation region SA in the near future. When the determination result of S10 is positive, that is, when it is predicted that the engine operating point OPeng enters the noise generation region SA in the near future, S20 corresponding to the function of the duration time determining unit 110a and the prediction unit 110b is performed. When the determination result of S10 is negative, that is, when it is predicted that the engine operating point OPeng does not enter the noise generation region SA in the near future, S30 corresponding to the function of the engine operating point control unit 110 is performed. In S20, it is determined whether the predicted noise generation duration time TMg is greater than the predetermined time TMg1.

When the determination result of S20 is positive (time point t2 in FIG. 11), that is, when the noise generation duration time TMg is greater than the predetermined time TMg1 (TMg>TMg1) and the first condition CD1 is satisfied, S40 corresponding to the function of the engine operating point control unit 110 is performed. When the determination result of S20 is negative, that is, when the noise generation duration time TMg is equal to or less than the predetermined time TMg1 (TM≤TMg1) and the second condition CD2 is satisfied, S30 is performed. In S30, the engine 12 and the differential unit 60 are controlled such that the engine operating point OPeng is the optimal engine operating point OPengf in the optimal fuel-efficiency operating line Leng in which the required engine power Pedem is realized. In S40, the engine 12 and the differential unit 60 are controlled such that the engine operating point OPeng is an engine operating point OPeng at which generation of noise is curbed and which is outside of the engine operating point OPeng in the optimal fuel-efficiency operating line Leng.

Time point t1 in the timing chart illustrated in FIG. 11 represents a time point at which an accelerator pedal is depressed. In the timing chart illustrated in FIG. 11, when the accelerator pedal is depressed, the engine rotation speed Ne is increased such that the engine operating point OPeng reaches the optimal engine operating point OPengf in the optimal fuel-efficiency operating line Leng. Then, at time point t2, when the region predicting unit 112 predicts that the engine operating point OPeng enters the noise generation region SA and the duration time determining unit 110a determines that the noise generation duration time TMg in which the engine operating point OPeng will stay in the noise generation region SA is greater than the predetermined time TMg1, the engine torque Te is not increased and the engine rotation speed Ne is increased such that the engine operating point OPeng reaches an engine operating point OPeng at which generation of noise is curbed and which is outside of an engine operating point OPeng in the optimal fuel-efficiency operating line Leng.

According to this embodiment described above, the electronic control unit 100 includes the prediction unit 110b that predicts the noise generation duration time TMg in which the engine operating point OPeng will stay in the noise generation region SA when the engine operating point OPeng reaches an engine operating point OPeng in the noise generation region SA in which noise is generated in the optimal fuel-efficiency operating line Leng at the time of controlling the engine 12 and the differential unit 60 such that the engine operating point OPeng reaches an engine operating point OPeng in the optimal fuel-efficiency operating line Leng, and the engine operating point control unit 110 that controls the engine 12 and the differential unit 60 such that engine operating point OPeng reaches engine operating point OPeng in the optimal fuel-efficiency operating line Leng when the noise generation duration time TMg predicted by the prediction unit 110b is equal to or less than a predetermined time TMg1 which is determined in advance and controls the engine 12 and the differential unit 60 such that the engine operating point OPeng reaches an engine operating point OPeng at which generation of noise is curbed and which is outside of an engine operating point OPeng in the optimal fuel-efficiency operating line Leng when the noise generation duration time TMg predicted by the prediction unit 110b is greater than the predetermined time TMg1. Accordingly, when the noise generation duration time TMg predicted by the prediction unit 110b is equal to or less than the predetermined time TMg1 and it is predicted that generation of the noise can be further curbed in comparison with a case in which the noise generation duration time TMg in which noise is generated is relatively short and the noise generation duration time TMg is greater than the predetermined time TMg1, the engine operating point control unit 110 controls the engine 12 and the differential unit 60 such that the engine operating point OPeng reaches an engine operating point OPeng in the optimal fuel-efficiency operating line Leng. As a result, it is possible to curb generation of noise and to curb a decrease in fuel efficiency.

According to this embodiment, the engine 12 includes the supercharger SC and the prediction unit 110b predicts the noise generation duration time TMg based on the rate of change Vp of the supercharging pressure Pchg from the supercharger SC. Accordingly, when the engine 12 includes the supercharger SC, the prediction unit 110b can appropriately predict the noise generation duration time TMg based on the rate of change Vp of the supercharging pressure Pchg.

According to this embodiment, the supercharger SC includes the electric compressor 19c and the electric motor 19m that rotationally drives the electric compressor 19c, and changes the supercharging pressure Pchg by controlling the rotation speed Ncp of the electric compressor 19c using the electric motor 19m. Accordingly, particularly, when the supercharger SC changes the supercharging pressure Pchg by controlling the rotation speed Ncp of the electric compressor 19c using the electric motor 19m, the prediction unit 110b can appropriately predict the noise generation duration time TMg.

According to this embodiment, the area of the noise generation region SA changes depending on the travel conditions of the vehicle 10 and the prediction unit 110b predicts the noise generation duration time TMg based on the area of the noise generation region SA. Accordingly, the prediction unit 110b can appropriately predict the noise generation duration time TMg based on the area of the noise generation region SA.

Another embodiment of the disclosure will be described below. In the following description, elements which are common to the embodiments will be referred to by the same reference signs and description thereof will be omitted.

Figures 12, 13:
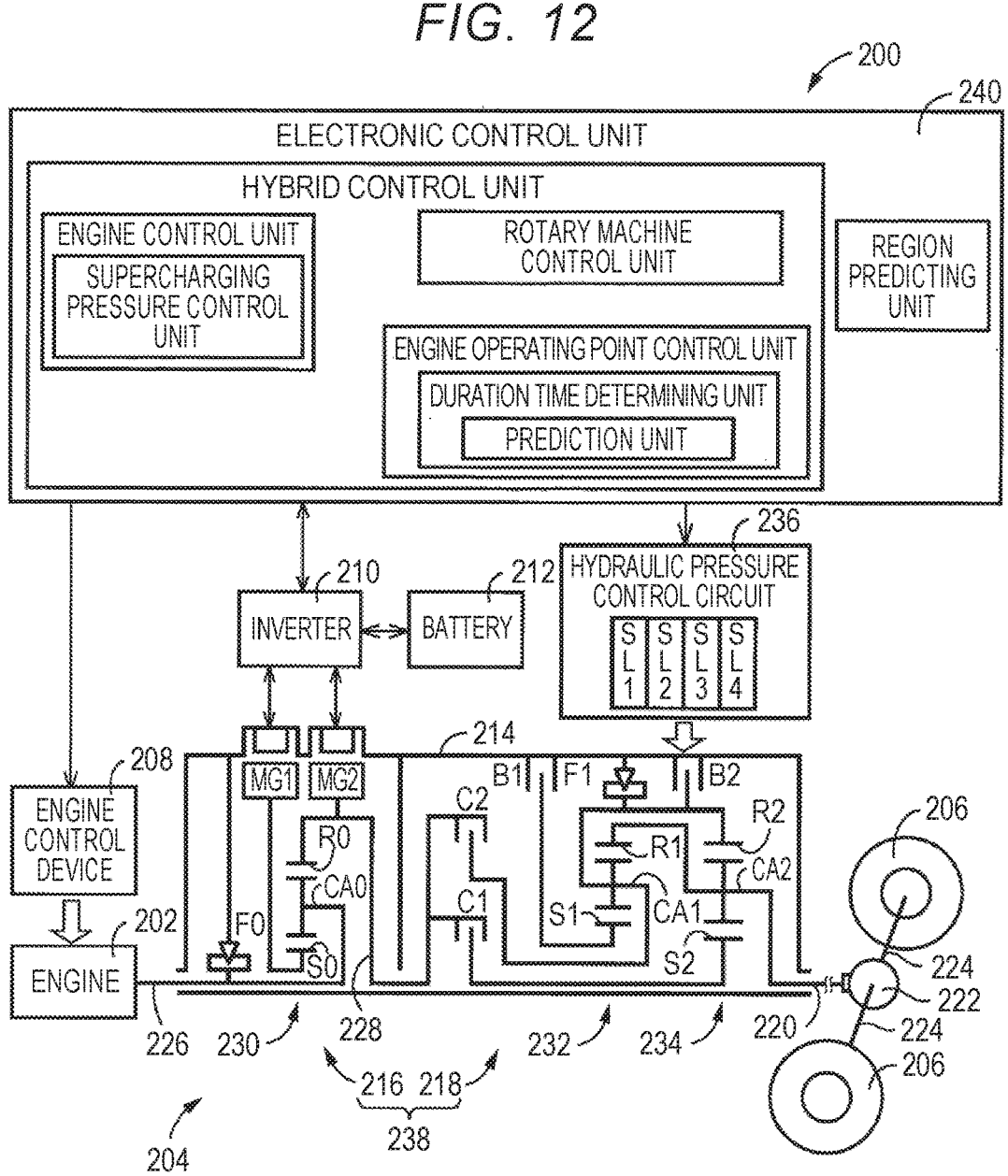
FIG. 12 is a diagram schematically illustrating a vehicle to which the disclosure is applied and which is different from the vehicle illustrated in FIG. 1.
FIG. 13 is an operation table illustrating a relationship between a gear shifting operation of a stepped gear shifting unit illustrated in FIG. 12 and a combination of operations of engagement devices which are used therein.

In this embodiment, a vehicle 200 which is different from the vehicle 10 described above in the first embodiment and which is illustrated in FIG. 12 is exemplified. FIG. 12 is a diagram schematically illustrating a configuration of a vehicle 200 to which the disclosure is applied. In FIG. 12, the vehicle 200 is a hybrid vehicle including an engine 202, a first rotary machine MG1, a second rotary machine MG2, a power transmission device 204, and driving wheels 206.

The engine 202, the first rotary machine MG1, and the second rotary machine MG2 have the same configurations as the engine 12, the first rotary machine MG1, and the second rotary machine MG2 described above in the first embodiment. An engine torque Te of the engine 202 is controlled by causing an electronic control unit (a control device) 240 which will be described later to control an engine control device 208 including a throttle actuator, a fuel injection device, an ignition device, a waste gate valve, an electric motor, and an air bypass valve which are provided in the vehicle 200. The first rotary machine MG1 and the second rotary machine MG2 are connected to a battery (a power storage device) 212 that is provided in the vehicle 200 via an inverter 210 which is provided in the vehicle 200. An MG1 torque Tg and an MG2 torque Tm of the first rotary machine MG1 and the second rotary machine MG2 are controlled by causing the electronic control unit 240 to control the inverter 210.

The power transmission device 204 includes an electrical stepless gear shifting unit (a stepless gear shifting mechanism) 216 and a mechanical stepped gear shifting unit 218 which are arranged in series on a common axis in a case 214 that is a non-rotary member attached to a vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 12. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits the power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. That is, the stepless gear shifting unit 216 is a stepless gear shifting mechanism that can adjust the engine rotation speed Ne by changing a gear ratio $\gamma 1$ (=Ne/Ncd) by controlling the operating state of the first rotary machine MG1. The gear ratio $\gamma 1$ is expressed as a value of the ratio of the engine rotation speed Ne to the rotation speed Ncd of the intermediate transmission member 228.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a mechanical gear shifting mechanism which is a stepped transmission constituting at least a part of a power transmission path between the intermediate transmission member 228 and the driving wheels 206, that is, an automatic transmission constituting a part of the power transmission path between the differential mechanism 230 and the driving wheels 206. The intermediate transmission member 228 also serves as an input rotary member of the stepped gear shifting unit 218. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using adjusted engagement oil pressures PRcb of the engagement devices CB which are output from solenoid valves SL1 to SL4 in a hydraulic pressure control circuit 236 which is provided in the vehicle 200.

In the stepped gear shifting unit 218, rotary elements of the first planetary gear unit 232 and the second planetary gear unit 234 are partially connected to each other or are connected to the intermediate transmission member 228, the case 214, or the output shaft 220 directly or indirectly via the engagement devices CB or the one-way clutch F1. The rotary elements of the first planetary gear unit 232 are a sun gear S1, a carrier CA1, and a ring gear R1, and the rotary elements of the second planetary gear unit 234 are a sun gear S2, a carrier CA2, and a ring gear R2.

In the stepped gear shifting unit 218, one gear stage of a plurality of gear stages with different gear ratios $\gamma at$ (=AT input rotation speed Ni_at/AT output rotation speed No_at) is formed by engaging one of a plurality of engagement devices. In this embodiment, a gear stage which is formed in the stepped gear shifting unit 218 is referred to as an AT gear stage. The AT input rotation speed Ni_at is an input rotation speed of the stepped gear shifting unit 218 and has the same value as the rotation speed Ncd of the intermediate transmission member 228 and the same value as the MG2 rotation speed Nm. The AT output rotation speed No_at is a rotation speed of the output shaft 220 which is an output rotation speed of the stepped gear shifting unit 218 and is also an output rotation speed of a composite transmission 238 which is a combined transmission including the stepless gear shifting unit 216 and the stepped gear shifting unit 218.

In the stepped gear shifting unit 218, for example, as illustrated in an engagement operation table of FIG. 13, four forward AT gear stages including a first AT gear stage ("1st" in the drawing) to a fourth AT gear stage ("4th" in the drawing) are formed as a plurality of AT gear stages. The gear ratio $\gamma at$ of the first AT gear stage is the highest and the gear ratio $\gamma at$ becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel as will be described later. The engagement operation table illustrated in FIG. 13 is obtained by collecting relationships between the AT gear stages and the operation states of the plurality of engagement devices. In FIG. 13, "O" denotes engagement, "A" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 240 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed. In this embodiment, for example, downshift from the second AT gear stage to the first AT gear stage is referred to as 2→1 downshift. The same is true of another upshift or downshift.

The vehicle 200 further includes a one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a forward rotating direction which is a rotating direction at the time of operation of the engine 202 and is automatically engaged in a reverse rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the forward rotating direction of the carrier CA0 which is a rotating direction at the time of operation of the engine 202 and prohibits rotation in the reverse rotating direction of the carrier CA0. That is, the one-way clutch F0 is a lock mechanism that can permit rotation in the forward rotating direction of the engine 202 and prohibit rotation in the reverse rotating direction of the engine 202.

The vehicle 200 further includes an electronic control unit 240 which is a controller including a control device for the vehicle 200 associated with control of the engine 202, the first rotary machine MG1, the second rotary machine MG2, and the like. The electronic control unit 240 has the same configuration as the electronic control unit 100 described above in the first embodiment. The electronic control unit 240 is supplied with various signals which are the same as supplied to the electronic control unit 100. Various command signals which are the same as output from the electronic control unit 100 are output from the electronic control unit 240. The electronic control unit 240 has functions equivalent to the functions of the engine operating point control unit 110, the duration time determining unit 110a, the prediction unit 110b, and the region predicting unit 112 which are included in the electronic control unit 100. The electronic control unit 240 can realize a control function of curbing generation of noise and curbing a decrease in fuel efficiency, which is the same function as realized by the electronic control unit 100 described above in the first embodiment.

While embodiments of the disclosure have been described above in detail with reference to the accompanying drawings, the disclosure can be applied to other aspects.

For example, in the first embodiment, the prediction unit 110b predicts the noise generation duration time TMg when the region predicting unit 112 predicts that the engine operating point OPeng enters the noise generation region SA in the near future. For example, the prediction unit 110b may predict the noise generation duration time TMg when the engine operating point OPeng actually enters the noise generation region SA. That is, the prediction unit 110b predicts the noise generation duration time TMg when the engine operating point OPeng reaches an engine operating point OPeng in the noise generation region SA. The case in which the engine operating point OPeng reaches an engine operating point OPeng in the noise generation region SA includes a case in which it is predicted that the engine operating point OPeng enters the noise generation region SA in the near future as in the first embodiment and a case in which the engine operating point OPeng actually enters the noise generation region SA as described above.

In the first embodiment, when the accelerator pedal is depressed and the first condition CD1 is satisfied as illustrated in the timing chart of FIG. 11, the engine 12 and the differential unit 60 are controlled such that the engine operating point OPengC1 reaches an engine operating point OPengC2 in which generation of noise is curbed and which is outside of an engine operating point OPeng in the optimal fuel-efficiency operating line Leng, for example, as illustrated in FIG. 4. For example, in the first embodiment, when the accelerator pedal is returned to change the engine operating point OPeng from the engine operating point OPengB to the engine operating point OPengA in the state in which the accelerator pedal has been depressed and the engine operating point OPeng has reached, for example, the engine operating point OPengB (see FIG. 4) and the first condition CD1 is satisfied, the engine 12 and the differential unit 60 may be controlled such that the engine operating point OPeng reaches an engine operating point OPeng at which generation of noise is curbed and which is outside of an engine operating point OPeng in the optimal fuel-efficiency operating line Leng. When the accelerator pedal is returned to change the engine operating point OPeng from the engine operating point OPengB to the engine operating point OPengA and the second condition CD2 is satisfied, the engine 12 and the differential unit 60 are controlled such that the engine operating point OPeng reaches an engine operating point OPeng in the optimal fuel-efficiency operating line Leng.

In the first embodiment, the engine 12 includes the supercharger SC, but the engine 12 does not have to include the supercharge SC. When the engine 12 does not include a supercharger SC, the prediction unit 110b calculates the noise generation duration time TMg, for example, using a predetermined expression with the area AR of the noise generation region SA, the rate of change Vt of the engine torque Te, the rate of change Vg of the MG1 torque Tg, that is, the reaction torque, of the first rotary machine MG1, and the like as variables. The rate of change Vt [Nm/sec] of the engine torque Te is an amount of change of the engine torque Te per unit time. For example, the rate of change Vt of the engine torque Te in the expression is calculated based on a throttle valve opening amount θth_n and an engine rotation speed Ne_n which are detected by the throttle valve opening amount sensor 44 and the engine rotation speed sensor 88 when the region predicting unit 112 predicts that the engine operating point OPeng enters the noise generation region SA in the near future and a previous throttle valve opening amount θth_n−1 and a previous engine rotation speed Ne_n−1 which are detected by the throttle valve opening amount sensor 44 and the engine rotation speed sensor 88 before the throttle valve opening amount θth_n and the engine rotation speed Ne_n are detected.

In the first embodiment, in the noise generation region SA, the area of the noise generation region SA changes depending on the travel conditions of the vehicle 10, for example, the magnitude of the MG2 torque Tm which is output from the second rotary machine MG2. For example, in the vehicle 200 according to the second embodiment including the stepped gear shifting unit 218 in which a plurality of gear stages is formed, the area of the noise generation region SA differs depending on the gear stage which is formed in the stepped gear shifting unit 218 even when the magnitude of the MG2 torque Tm output from the second rotary machine MG2 is constant.

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear unit in which the first rotary machine MG1 and the drive gear 74 are connected to a pinion which is rotationally driven by the engine 12 and a pair of bevel gears engaging with the pinion, respectively. The second planetary gear mechanism 82 may be a mechanism with a configuration in which two or more planetary gear units are connected to each other via some rotary elements constituting them and the engine, the rotary machines, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but the disclosure is not limited to this aspect. For example, this lock mechanism may be an engagement device such as a mesh type clutch, a hydraulic frictional engagement device such as a clutch or a brake, a dry engagement device, an electromagnetic frictional engagement device, or a magnetic powder type clutch which selectively connects the connection shaft 226 and the case 214. Alternatively, the vehicle 200 does not have to include the one-way clutch F0.

In the second embodiment, the stepped gear shifting unit 218 is exemplified above as an automatic transmission constituting a part of the power transmission path between the differential mechanism 230 and the driving wheels 206, but the disclosure is not limited to this aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission.

In the above-mentioned embodiments, the supercharger SC may include an actuator, for example, an electric motor, that is connected to the compressor 18c of the supercharger 18 and can control the rotation speed of the compressor 18c instead of including the electric supercharger 19 separately from the supercharger 18. Alternatively, the supercharger SC may include only one supercharger of the supercharger 18 and the electric supercharger 19.

The above embodiments are merely exemplary and the disclosure can be embodied in various forms which have been subjected to various modifications and improvements based on knowledge of those skilled in the art.

What is claimed is:

1. A control device for a vehicle including an engine and a stepless gear shifting mechanism that is able to adjust a rotation speed of the engine, the control device controlling the engine and the stepless gear shifting mechanism such that an operating point of the engine reaches an operating point in a predetermined optimal fuel-efficiency operating line, the control device comprising:
    a prediction unit configured to predict a noise generation duration time in which the operating point of the engine will stay in a noise generation region in which noise is generated in the optimal fuel-efficiency operating line when the operating point of the engine reaches an operating point in the noise generation region at the time of controlling the engine and the stepless gear shifting mechanism such that the operating point of the engine reaches an operating point in the optimal fuel-efficiency operating line; and
    a control unit configured to control the engine and the stepless gear shifting mechanism such that the operating point of the engine reaches an operating point in the optimal fuel-efficiency operating line when the noise generation duration time predicted by the prediction unit is equal to or less than a predetermined time which is determined in advance and to control the engine and the stepless gear shifting mechanism such that the operating point of the engine reaches an operating point at which generation of noise is curbed and which is outside of an operating point in the optimal fuel-efficiency operating line when the noise generation duration time predicted by the prediction unit is greater than the predetermined time.

2. The control device for a vehicle according to claim 1, wherein the engine includes a supercharger, and
    wherein the prediction unit is configured to predict the noise generation duration time based on a rate of change of a supercharging pressure from the supercharger.

3. The control device for a vehicle according to claim 2, wherein the supercharger includes a compressor and a compressor rotary machine that rotationally drives the compressor, and changes the supercharging pressure by controlling a rotation speed of the compressor using the compressor rotary machine.

4. The control device for a vehicle according to claim 1, wherein an area of the noise generation region changes depending on a travel state of the vehicle, and
    wherein the prediction unit is configured to predict the noise generation duration time based on the area of the noise generation region.

* * * * *